United States Patent [19]

Homma et al.

[11] Patent Number: 5,500,464
[45] Date of Patent: Mar. 19, 1996

[54] TWO PACK TYPE CURABLE COMPOSITION COMPRISING EPOXY RESIN AND SILICON-CONTAINING ELASTOMERIC POLYMER

[75] Inventors: Michihide Homma, Takasago; Atsuko Yoshihara, Kobe; Hiroshi Wakabayashi, Kobe; Katsuhiko Isayama, Kobe, all of Japan

[73] Assignee: Kanegafuchi Chemical Industry Co., Ltd., Osaka, Japan

[21] Appl. No.: 180,797

[22] Filed: Jan. 10, 1994

Related U.S. Application Data

[63] Continuation of Ser. No. 444,879, Nov. 21, 1989, abandoned.

[30] Foreign Application Priority Data

Nov. 21, 1988 [JP] Japan .................................. 63-293928

[51] Int. Cl.$^6$ ...................................................... C08K 3/26
[52] U.S. Cl. ........................... 523/435; 523/457; 524/788; 525/100; 525/101; 528/27
[58] Field of Search ..................................... 523/435, 433, 523/457, 458; 524/788; 528/27; 525/100, 101

[56] References Cited

U.S. PATENT DOCUMENTS 4,657,986  4/1987  Isayama et al. ........................ 525/407

FOREIGN PATENT DOCUMENTS 0184829  6/1986  European Pat. Off. .
0186191  7/1986  European Pat. Off. .

*Primary Examiner*—Ralph H. Dean
*Attorney, Agent, or Firm*—Foley & Lardner

[57] ABSTRACT

A two-pack type curable composition comprising:

A. a first liquid containing an organic elastomeric polymer having at least one silicon-containing reactive group in a molecule and a curing agent for an epoxy resin, and B. a second liquid containing an epoxy resin, at least one organic tin compound selected from the group consisting of compounds of the formulae:

$$R^1_2Sn(OCOR^2)_2 \qquad (I)$$

and $$(R^1_2Sn)_2O \qquad (II)$$
$$\quad |$$
$$\text{OCO}-R^2$$

wherein $R^1$ is a monovalent hydrocarbon group, and $R^2$ is a monovalent aliphatic hydrocarbon group having 7 to 19 carbon atoms, and an inorganic filler, which composition has good storage stability.

11 Claims, No Drawings

TWO PACK TYPE CURABLE COMPOSITION COMPRISING EPOXY RESIN AND SILICON-CONTAINING ELASTOMERIC POLYMER

This application is a continuation of U.S. application Ser. No. 07/444,879 filed Nov. 21, 1989, now abandoned.

BACKGROUND OF THE INVENTION

1. Field of the Invention

The present invention relates to a two-pack type curable composition comprising an epoxy resin and an organic elastomeric polymer having at least one silicon-containing reactive group in a molecule.

2. Description of the Related Art

A curable composition comprising an epoxy resin and an organic elastomeric polymer having at least one silicon-containing group to the silicon atom of which a hydroxyl group and/or a hydrolyzable group are bonded and which is cross linkable through formation of a siloxane linkage (hereinafter referred to as "silicon-containing reactive group) in a molecule, and such composition is used, for example, as an adhesive (cf. U.S. Pat. No. 4,657,986).

When such a composition is formulated in the form of a two-pack type curable composition and one liquid contains the epoxy resin and a curing agent for the organic elastomeric polymer having the silicon-containing reactive group, the composition has a deteriorated curing rate after storage. Such deterioration of the curing agent is remarkable when an inorganic filler is used.

SUMMARY OF THE INVENTION

An object of the present invention is to provide a two pack type curable composition comprising an epoxy resin and an organic elastomeric polymer having a silicon-containing reactive group which suffers no or little decrease of the curing rate.

Accordingly, the present invention provides a two-pack type curable composition comprising:

A. a first liquid containing an organic elastomeric polymer having at least one silicon-containing reactive group in a molecule and a curing agent for an epoxy resin, and B. a second liquid containing an epoxy resin, at least one organic tin compound selected from the group consisting of compounds of the formulae:

$$R^1_2Sn(OCOR^2)_2 \quad \text{(I)}$$

and

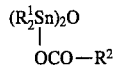
$$OCO-R^2 \quad \text{(II)}$$

wherein $R^1$ is a monovalent hydrocarbon group, and $R^2$ is a monovalent aliphatic hydrocarbon group having 7 to 19 carbon atoms, and an inorganic filler.

DETAILED DESCRIPTION OF THE INVENTION

Specific examples of a backbone of the organic elastomeric polymer having at least one silicon-containing reactive group in a molecule are polyethers prepared by ring opening polymerization of cyclic ethers (e.g. propylene oxide, ethylene oxide, tetrahydrofuran and the like); polyesters prepared by polycondensation of a dibasic acid (e.g. adipic acid) and glycol or ring opening polymerization of lactones; ethylene/propylene copolymers; polyisobutylene and copolymers of isobutylene with isoprene and the like; polychloroprene; polyisoprene and copolymers of isoprene with butadiene, styrene, acrylonitrile and the like; polybutadiene and copolymers of butadiene with styrene, acrylonitrile and the like; polyolefins prepared by hydrogenating polyisoprene, polybutadiene or isoprene/butadiene copolymers; polyacrylates prepared by radical polymerization of acrylate (e.g. ethyl acrylate, butyl acrylate and the like) and copolymers of acrylate with vinyl acetate, acrylonitrile, styrene, ethylene and the like; graft polymers prepared by polymerizing a vinyl monomer in the organic elastomeric polymer which is used in the present invention; polysulfides; and the like. Among them, preferable are polyethers comprising repeating units of the formula: —R—O— wherein R is a $C_2$-$C_4$ alkylene group (e.g. polypropylene oxide and the like); graft polymers prepared by polymerizing a vinyl monomer (e.g. acrylate, styrene, acrylonitrile, vinyl acetate and the like) in the presence of polyether (e.g. polypropylene oxide and the like); polyalkyl acrylate or copolymers of at least 50% by weight of alkyl acrylate with vinyl acetate, acrylonitrile, styrene, ethylene and the like, since they can easily introduce the silicon-containing reactive group at a chain end of the molecule and are suitable for the preparation of a liquid polymer in the absence of a solvent. Particularly, polypropyleneoxide is preferable since it imparts water resistance to the cured product and is cheap and easily handled as a liquid material.

Typically, the silicon-containing reactive group is represented by the formula:

wherein X is a hydroxyl group or a hydrolyzable group, $R^3$ is a monovalent hydrocarbon group having 1 to 20 carbon atoms or a triorganosiloxy group of the formula: $R_3^4$—Si—O— in which $R^4$ is a monovalent hydrocarbon group having 1 to 20 carbon atoms, "a" is 0, 1, 2 or 3, "b" is 0, 1 or 2 provided that the total of "a" and "b" is at least 1, preferably from 1 to 4, and "m" is 0 or an integer of 1 to 18.

When X is the hydrolyzable group, the group (III) is cross linked through hydrolysis with water and a silanol condensation reaction in the presence or absence of a catalyst for the silanol condensation. When X is the hydroxyl group, the group (III) is cross linked through the silanol condensation reaction in the presence or absence of a catalyst for silanol condensation.

Specific examples of the hydrolyzable group are a hydrogen atom, a halogen atom, an alkoxy group, an acyloxy group, a ketoximate group, an amino group, an amide group, an aminoxy group, a mercapto group, an alkenyloxy group and the like. Among them, the alkoxy group is preferable since it is mildly hydrolyzed and easily handled.

The silicon-containing reactive group has at least one silicon atom. When the silicon atoms are bonded through siloxane linkages, the silicon-containing reactive group preferably has not more than 20 silicon atoms.

Among the silicon-containing reactive group (III), a group of the formula:

$$-\underset{|}{\overset{R^3_{3-c}}{Si}}-X_c \quad (IV)$$

wherein $R^3$ and X are the same as defined above, and "c" is 1, 2 or 3 is preferable from the economical view point.

The silicon-containing reactive group (IV) chemically bonds to the backbone chain of the organic elastomeric polymer. It is not preferable for the silicon-containing reactive group to be bonded to the backbone chain through a bond structure of the formula: ≡Si—O—C≡, since such structure tends to be cleavaged with water. A preferable bonding structure between the silicon atom of the reactive group and the backbone chain is, for example, a structure of the formula: ≡Si—C≡.

The silicon-containing reactive group may be introduced in the organic elastomeric polymer by following manners;

(1) Copolymerizing a monomer having a copolymerizable unsaturated bond and the silicon-containing reactive group (e.g. vinyltrialkoxysilane, methacryloyloxypropylmethyldialkoxysilane, methacryloyloxypropyltrialkoxysilane and the like) with a polymerizable monomer (e.g. ethylene, propylene, isobutylene, chloroprene, isoprene, butadiene, acrylate and the like); or copolymerizing a monomer having a copolymerizable epoxy group and the silicon-containing reactive group (e.g. γ-glycidoxypropyltrimethoxysilane, γ-glycidoxypropylmethyldimethoxysilane and the like) with propylene oxide or ethylene oxide. By this manner, the silicon-containing reactive group is introduced in the side chain of the organic polymer.

(2) Polymerizing a radically polymerizable monomer in the presence of a mercapto or disulfide type chain transfer agent having the silicon-containing reactive group (e.g. mercaptopropyltrialkoxysilane, mercaptopropylmethyldialkoxysilane and the like).

(3) Polymerizing a radically polymerizable monomer by the use of an azo or peroxide type polymerization initiator having the silicon-containing reactive group (e.g. azo-bis-2-(6-methyldiethoxysilyl-2-cyanohexane) and the like).

By the manners (2) and (3), the silicon-containing reactive group is introduced at the chain end of the polymer molecule.

(4) Reacting a compound having a functional group Y' and the silicon-containing reactive group with a polymer having a functional group Y reactive with the functional group Y' (e.g. a hydroxyl group, a carboxyl group, a mercapto group, an epoxy group, an isocyanate group and the like) on the side chain and/or at the chain end of the molecule.

Specific examples of the reaction (4) are shown in following Table.

TABLE 1

| Functional group Y | Functional group Y' | Resulting bond |
|---|---|---|
| —COOH | HO— | —COO— |
| ↑ | CH₂—CH— (epoxide) | —COOCH₂CH(OH)— |
| ↑ | H₂N— | COO⁻H₃N⁺— or —CONH— |
| ↑ | OCN— | —COOCONH— |
| ↑ | CH₂=CHCOO— | —COOCH₂CH₂COO— |
| —OH | OCN— | —OCONH— |

TABLE 1-continued

| Functional group Y | Functional group Y' | Resulting bond |
|---|---|---|
| —SH | CH₂—CH— (epoxide) | —SCH₂CH(OH)— |
| ↑ | OCN— | —SCONH— |
| ↑ | CH₂=CHCOO— | —SCH₂CH₂COO— |
| ↑ | CH₂=CH— | —SCH₂CH₂— |
| ↑ | ClCH₂— | —SCH₂— |
| —CH—CH₂ (epoxide) | HOOC— | —CHCH₂OCO— with OH |
| ↑ | HS— | —CHCH₂S— with OH |
| ↑ | H₂N— | —CHCH₂NH— with OH |
| ↑ | HO— | —CHCH₂O— with OH |
| —NH₂ | CH₂—CH— (epoxide) | —NHCH₂—CH(OH)— |
| ↑ | OCN— | —NHCONH— |
| ↑ | HOOC— | —⁺NH₃O⁻CO— or —NHCO— |
| ↑ | ClCH₂— | —⁺NH₂CH₂— Cl⁻ |
| ↑ | CH₂=CHCOO— | —NHCH₂CH₂COO— |
| —CONH₂ | OCN— | —CONHCONH— |
| —CH=CH₂ | HS— | —CH₂CH₂S— |
| ↑ | H—Si≡ | —CH₂CH₂Si≡ |
| —NCO | HOOC— | —NHCOOCO— |
| ↑ | HO— | —NHCOO— |
| ↑ | HS— | —NHCOS— |
| ↑ | H₂N— | —NHCONH— |
| —CH—CH— O=C\ /C=O O (anhydride) | HO— | —CH—CH— O=C C=O HO O— |
| ↑ | H₂N— | —CH—CH— O=C C=O HO NH— |

Specific examples of the polymer having the functional group Y are polyetherpolyols comprising repeating units of the formula: —R—O— wherein R is a $C_2$-$C_4$ alkylene group (e.g. polyoxypropylenepolyol, polyoxyethylenepolyol, polyoxytetramethylenediol and the like); polyesterpolyols prepared by polycondensation of a dibasic acid (e.g. adipic acid) and glycol or ring opening polymerization of lactones; polyols or polycarboxylic acids of polyisobutylene; polyols or polycarboxylic acids of polybutadiene or copolymers of butadiene with styrene, acrylonitrile and the like; polyols of polyolefins prepared by hydrogenating polyisoprene or polybutadiene; polymer having an isocyanate functional group prepared by reacting the above polyols or polycarboxylic acids with polyisocyanate; polymers having an ethylenically unsaturated bond prepared by reacting the above polyols with a halogen-containing ethylenically unsaturated compound, and the like. Among them, preferable are those having the functional group Y at the chain end of the molecule.

Specific examples of the silicon-containing compound having the functional group Y' are amino group-containing silanes (e.g. γ-(2-aminoethyl)aminopropyltrimethoxysilane, γ-(2-aminoethyl)aminopropylmethyldimethoxysilane, γ-aminopropyltriethoxysilane and the like); mercapto group-containing silanes (e.g. γ-mercaptopropyltrimethoxysilane, γ-mercaptopropylmethyldimethoxysilane and the like); epoxysilanes (e.g. γ-glycidoxypropyltrimethoxysilane, β-(3, 4-epoxycyclohexyl)ethyltrimethoxysilane and the like); ethylenically unsaturated silanes (e.g. vinyltriethoxysilane, γ-methacryloyloxypropyltrimethoxysilane, γ-acryloyloxypropylmethyldimethoxysilane and the like); chlorine-containing silanes (e.g. γ-chloropropyltrimethoxysilane and the like); isocyanate-containing silanes (e.g. γ-isocyanatepropyltriethoxysilane, γ-isocyanatepropylmethyldimethoxysilane and the like); and hydrosilanes (e.g. methyldimethoxysilane, trimethoxysilane, methyldiethoxysilane and the like).

Among the combinations of the polymer having the functional group Y and the compound having the functional group Y', (i) a combination of the polymer having an isocyanate group and the amino group- or mercapto group-containing silane and (ii) a combination of the polymer having an ethylenically unsaturated group and the hydrosilane are preferable. Among the combination (ii), a combination of polypropyleneoxide having an allylether group at the chain end and the hydrosilane is particularly preferable. In the combination (ii), a silyl group can be introduced in the polymer by a hydrosilylation reaction between a vinyl group and a hydrosilyl group in the presence of a platinum catalyst.

The organic elastomeric polymer has at least one, preferably 1.2 to 6 silicon-containing reactive groups in a molecule on the average. When the number of the silicon-containing group in a molecule is less than one on the average, the composition of the invention is not effectively cured and the improvement of the properties is not satisfactorily achieved. Preferably, the silicon-containing reactive group is attached to the chain end of the organic polymer molecule, because the terminal silicon-containing reactive group elongates the chain length between the adjacent cross linking sites in the cured product so that the rubbery elasticity is easily achieved, so that brittleness of the epoxy resin is more effectively improved, and the elastomeric cured product has better strength.

The molecular weight of the organic polymer having the silicon-containing reactive group is usually from 500 to 50,000, preferably from 1,000 to 20,000 since in this molecular weight range, the polymer is in a liquid state.

The silicon-containing reactive group having a silicon atom to which a hydroxyl group is attached may be prepared by hydrolyzing the silicon-containing reactive group having a silicon atom to which a hydrolyzable group is attached.

Preferable examples of the organic polymer having the silicon-containing reactive group are disclosed in U.S. Pat. Nos. 3,408,321, 3,453,230 and 3,592,795, Japanese Patent Publication Nos. 36319/1970, 12154/1971 and 32673/1974, and Japanese Patent Kokai Publication (unexamined) Nos. 156599/1975, 73561/1976, 6096/1979, 13767/1980, 13768/1979, 82123/1980, 123620/1980, 125121/1980, 131021/1980, 131022/1980, 135135/1980, 137129/1980, 179210/1982, 191703/1983, 78220/1984, 78221/1984, 78222/1984, 78223/1984 and 168014/1984.

The epoxy resin may be any one of conventionally used ones. Specific examples of the epoxy resin are flame-retardant epoxy resins (e.g. epichlorohydrin-bisphenol A type epoxy resin, epichlorohydrin-bisphenol F type epoxy resin, glycidyl ether of tetrabromobisphenol A and the like), novolak type epoxy resins, hydrogenated bisphenol A type epoxy resins, epoxy resins of the type of glycidyl ether of bisphenol A-propyleneoxide adduct, glycidyl p-oxybenzoate type epoxy resin, m-aminophenol type epoxy resins, diaminodiphenylmethane type epoxy resins, urethane modified epoxy resins, alicyclic epoxy resins, glycidyl ether of polyhydric alcohol (e.g. N,N-diglycidylaniline, N,N-diglycidyl-o-toluidine, triglycidylisocyanurate, polyalkyleneglycol diglycidyl ether, glycerin and the like), hydantoin type epoxy resins, epoxidized unsaturated polymer such as petroleum resin, and the like. Among them, those having two epoxy groups of the formula:

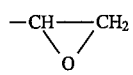

in a molecule are preferable since they are highly reactive during curing and the cured product easily forms a three dimensional network. Most preferable are the bisphenol A type epoxy resins and the novolak type epoxy resins.

A weight ratio of the epoxy resin to the organic elastomeric polymer is from 100:1 to 1:100, preferably from 100:10 to 10:100.

The curing agent for the epoxy resin used according to the present invention may be any one of the conventionally used ones. Specific examples of the curing agent are amines (e.g. triethylenetetramine, tetraethylenepentamine, diethylaminopropylamine, N-aminoethylpiperazine, m-xylylenediamine, m-phenylenediamine, diaminodiphenylmethane, diaminodiphenylsulfone, isophoronediamine, 2,4,6-tris(dimethylaminomethyl)phenol and the like); tert-amine salts; polyamide resins; imidazoles; dicyandiamides; complex compounds of boron trifluoride, carboxylic acid anhydrides (e.g. phthalic anhydride, hexahydrophthalic anhydride, tetrahydrophthalic anhydride, endomethylenetetrahydrophthalic anhydride, dodecinyl succinic anhydride, pyromellitic anhydride, chlorendic anhydride and the like); alcohols; phenols; and carboxylic acids.

The amount of the curing agent varies with the kinds of the epoxy resin and/or the curing agent. Usually, 0.1 to 300 parts by weight of the curing agent is used based on 100 parts by weight of the epoxy resin.

The organic tin compounds (I) and (II) are used as the curing agent (silanol condensation catalyst) for the organic elastomeric polymer having the silicon-containing reactive group.

Specific examples of the $R^1$ substituent are substituted or unsubstituted hydrocarbons having 1 to 20 carbon atoms, preferably 1 to 10 carbon atoms, such as alkyl groups or aryl groups (e.g. methyl, chloromethyl, ethyl, propyl, butyl, hexyl, octyl, phenyl, tolyl, etc.).

Specific examples of the $R^2$ substituents are straight or branched $C_7H_{15}$-, $C_9H_{19}$-, $C_{11}H_{23}$-, $C_{13}H_{27}$-, $C_{15}H_{31}$-, $C_{17}H_{35}$-, $C_{19}H_{39}$- and the like.

Specific examples of the organic tin compound are:

$(C_2H_5)_2Sn(OCOC_7H_{15})_2$, $[(C_2H_5)_2SnOCOC_7H_{15}]_2O$, $(C_4H_9)_2Sn(OCOC_7H_{15})_2$, $[(C_4H_9)_2SnOCOC_7H_{15}]_2O$, $(C_4H_9)_2Sn(OCOC_{11}H_{23})_2$, $[(C_4H_9)_2SnOCOC_{11}H_{23}]_2O$, $(C_4H_9)_2Sn(OCOC_{19}H_{39})_2$, $[(C_4H_9)_2SnOCOC_{19}H_{39}]_2O$.

The organic tin compound which is one of the components in the second liquid is used in an amount of 0.1 to 20 parts by weight per 100 parts by weight of the organic elastomeric polymer having the silicon-containing reactive group.

According to the present invention, the second liquid of the two-pack type curable composition contains the inorganic filler. Specific examples of the inorganic filler are asbestos, glass fibers, carbon fibers, mica, graphite, diatomaceous earth, china clay, fumed silica, precipitated silica, silicic anhydride, carbon black, calcium carbonate, clay, talc, titanium oxide, magnesium carbonate, quartz powder, aluminum powder, flint powder, zinc powder, and mixtures thereof. Among them, oxides, carbonates and bicarbonates of alkaline earth metals such as magnesium, calcium, barium and zinc are preferred.

Although the inorganic filler may be added only to the second liquid, it can be added to both of the first and second liquids.

The amount of the inorganic filler is from 1 to 500 parts by weight, preferably from 10 to 300 parts by weight per 100 parts by weight of the total amount of the organic elastomeric polymer having the silicon-containing reactive group and the epoxy resin.

In some cases, the curable composition of the present invention may contain other components. One of such other components is a silicon-containing compound having a silicon-containing reactive group and a functional group reactive with the epoxy group, which compound may improve compatibility of the organic elastomeric polymer having the silicon-containing reactive group and the epoxy resin.

Examples of the functional group reactive with the epoxy group are a primary, secondary or tertiary amino group, a mercapto group, an epoxy group and a carboxyl group. The silicon-containing reactive group may be the same as that of the organic elastomeric polymer in the first liquid. Particularly, the alkoxysilyl group is preferable due to its good handling properties.

Specific examples of the silicon-containing compound are amino group-containing silanes (e.g. γ-aminopropyltrimethoxysilane, γ-aminopropyltriethoxysilane, γ-aminopropylmethyldimethoxysilane, γ-(2-aminoethyl)aminopropyltrimethoxysilane, γ-(2-aminoethyl)aminopropylmethyldimethoxysilane, γ-(2-aminoethyl)aminopropyltriethoxysilane, γ-ureidopropyltriethoxysilane, N-β-(N-vinylbenzylaminoethyl)-γ -aminopropyltrimethoxysilane, γ-anilinopropyltrimethoxysilane and the like); mercapto group-containing silanes (e.g. γ-mercaptopropyltrimethoxysilane, γ-mercaptopropyltriethoxysilane, γ-mercaptopropylmethyldimethoxysilane, γ-mercaptopropylmethyldiethoxysilane and the like); epoxy group-containing silanes (e.g. γ-glycidoxypropyltrimethoxysilane, γ-glycidoxypropylmethyldimethoxysilane, γ-glycidoxypropyltriethoxysilane, β-(3,4-epoxycyclohexyl)ethyltrimethoxysilane and the like); carboxysilanes (e.g. β-carboxyethyltriethoxysilane, β-carboxyethylphenylbis(2-methoxyethoxy)silane, N-β-(N-carboxymethylaminoethyl)-γ-aminopropyltrimethoxysilane and the like). The silane compound may be used alone or as a mixture with at least one other silane compound.

The amount of the silicon-containing compound is so selected that a weight ratio of the total weight of the organic elastomeric polymer and the epoxy resin to the weight of the silicone compound (C), i.e. (A+B)/C, is from 100:1 to 100:20, preferably from 100:0.2 to 100:10.

The silicon-containing compound is preferably added to the first liquid of the two-pack type curable composition, although it may be added to the second liquid or both of the first and second liquids.

Further examples of the other components are organic fillers, anti-aging agents, UV light absorbing agents, lubricants, pigments, foaming agents, and the like.

The composition of the present invention may be used in various applications. For example, the composition is formed by a conventional molding method such as compression molding, transfer molding and injection molding to give a molded article having improved impact strength, flexibility and toughness, or a laminated article such as copper-clad laminated board and a laminated lumber. The composition of the present invention can be used as an adhesive with improved peel strength, a foam plastic with improved flexibility, a binding agent for a fiber board or a particle board, a coating, a binding agent for shell molding, a binder of a brake lining, a binder of a grindstone and a matrix resin of a composite material containing glass fiber or carbon fiber. Further, the composition of the present invention can be used for molding a solid rubber such as a natural rubber or a liquid elastomer such as polyurethane. Thereby, a molded elastomeric article and an expanded elastomeric article having improved strength are produced. The composition of the present invention may be used as a sealing agent and a pressure sensitive adhesive.

PREFERRED EMBODIMENTS OF THE INVENTION

The present invention will be illustrated by following Examples, in which "parts" are by weight unless otherwise indicated.

PREPARATION EXAMPLE 1

Polypropylene glycol having the number average molecular weight of 2500 (90 parts) and polypropylene triol having the number average molecular weight of 3000 (10 parts) were chain extended with methylene chloride according to the method described in U.S. Pat. No. 4,657,986 and molecular ends were capped with allyl chloride to obtain polypropylene oxide 99% of the terminal groups of which were capped with allyl ether groups and which had the number average molecular weight of 8000.

The resulting polypropylene oxide (800 g) and then methyldimethoxysilane (20 g) were charged in an autoclave equipped with a stirrer. After the addition of a solution of chloroplatinic acid (8.9 g of $H_2PtCl_5 \cdot 6H_2O$ in 18 ml of isopropanol and 160 ml of tetrahydrofurane) (0.40 ml), the reaction was continued at 80° C. for 6 hours while stirring.

An amount of the unreacted hydrosilyl groups in the reaction mixture was monitored by IR spectrum analysis to find that substantially no such group remained. According to determination of the silicon-containing group by NMR, it was confirmed that polypropylene oxide had, at the chain ends, about 1.75 groups of the formula:

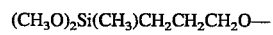

$(CH_3O)_2Si(CH_3)CH_2CH_2CH_2O-$ in a molecule on the average.

PREPARATION EXAMPLE 2

Polypropylene glycol having the number average molecular weight of 2000 was chain extended with methylene chloride and capped with allyl chloride to obtain polypropylene oxide 95% of the terminal groups of which were capped with allyl ether groups and which had the number average molecular weight of 5000.

The resulting polypropylene oxide (500 g) and then triethoxysilane (32 g) were charged in the autoclave equipped with stirrer. After the addition of the solution of chloroplatinic acid having the same composition as in Preparation Example 1 (0.40 ml), the reaction was continued at 90° C. for 3 hours.

After removing the excessive triethoxysilane under reduced pressure, an amount of the silicon-containing groups was measured by NMR to confirm that polypropylene oxide had, at the chain end, about 1.8 groups of the formula:

$(CH_3CH_2O)_3SiCH_2CH_2CH_2O-$ in a molecule on the average.

PREPARATION EXAMPLE 3

Polypropylene glycol having the number average molecular weight of 3000 (300 g) was charged in a flask equipped with a stirrer. Then, tolylenediisocyanate (26 g) and dibutyltin dilaurate (0.2 g) were added and reacted in a nitrogen stream at 100° C. for 5 hours while stirring. Thereafter, γ-aminopropyltriethoxysilane (22.1 g) was added and reacted at 100° C. for 3 hours to obtain a polyether having an average molecular weight of about 6600 and containing terminal triethoxysilane groups and about two silicon-containing reactive groups in a molecule.

PREPARATION EXAMPLE 4

Butyl acrylate (80 g), stearyl methacrylate (20 g), γ-methacryloyloxypropylmethyldimethoxysilane (2.2 g), γ-mercaptopropylmethyldimethoxysilane (1.8 g) and 2,2'-azobisisobutyronitrile (0.5 g) were homogeneously mixed. Then, the mixture (25 g) was charged in a four-necked 200 ml flask equipped with a stirrer and a condenser and heated to 80° C. on an oil bath while introducing nitrogen gas. Within several minutes, the polymerization was initiated with generating heat. After the heat generation calmed, the rest of the mixture was dropwise added over 3 hours to proceed polymerization. After 15 minutes and 30 minutes from the completion of addition of the mixture, azobisisobutyronitrile (each 0.15 g) was added. After the addition of the latter portion of azobisisobutyronitrile, stirring was continued for 30 minutes to complete the polymerization.

The resulting liquid polymer was analyzed by gas permeation chromatograph (GPC) to find that the polymer had the number average molecular weight of about 10,000.

EXAMPLE 1 AND COMPARATIVE EXAMPLES 1–3

Preparation of the First Liquid A

The polymer prepared in Preparation Example 1 (100 parts), 2,2'-methylene-bis-(4-methyl-6-tert.-butylphenol) (1 part), N-β-(aminoethyl)-γ-aminopropyltrimethoxysilane (1 part), vinyltrimethoxysilane (3 parts), ground calcium carbonate (44 parts) and 2,4,6-tris(dimethylaminomethyl)phenol (3 parts) were thoroughly mixed with a three-roll paint mill to prepare a compound.

Preparation of the Second Liquid B

Bisphenol A type epoxy resin (Epikote 828 (trade name) manufactured by Yuka Shell Epoxy Co., Ltd.) (50 parts), ground calcium carbonate (25 parts) and dibutyltin dilaurate (1 part) were throughly mixed with the three-roll paint mill to prepare a compound.

Each of the liquids A and B was stored in a sealed glass bottle at 50° C. for one month. Then, the liquid A (20 g) and the liquid B (10 g) were mixed and cured at 23° C., 50% RH and a surface hardening time (tack free time with finger touching, namely a time in which surface tackiness disappeared) was measured.

For Comparison, a liquid B in which an organic tin compound shown in Table 1 was used in place of dibutyltin dilaurate was prepared and used.

The results are shown in Table 1.

TABLE 1

| | Example No. | | | |
|---|---|---|---|---|
| | 1 | C.1 | C.2 | C.3 |
| Organic tin compound in liquid B*[1]) | DTL | DTP | #918 | DBTA |
| Tack free time (Hrs) | | | | |
| Before storage | 7.2 | 12 | 3.1 | 1.8 |
| After storage | 4.6 | 25 | 41 | 28 |

Note:
[1])DTL: Dibutyltin dilaurate.
DTP: Dibutyltin diphthalate (LF101 manufactured by Tokyo Fine Chemicals).
918: Organic tin compound manufactured by Sankyo Organic Synthesis.
DBTA: Dibutyltin diacetylacetonate.

As is seen from the results of Table 1, dibutyltin dilaurate does not deteriorate the curing rate after storage of the composition, and the composition has good storage stability.

According to the procedures of JIS K 6850 and JIS K 6854, the adhesive properties (tensile shear strength and T-shape peeling strength) of the composition was evaluated with a mixture of the liquid A (40 g) and the liquid B (20 g) both prepared in Example 1.

Tensile Shear Strength

On an aluminum plate (according to JIS H 4000. A-1050P. 100 mm×25 mm×2.0 mm), the mixture was coated in a thickness of about 0.05 mm. A pair of the same plates coated with the mixture were laminated with facing the coated surfaces to each other and pressed by hand. The laminated plates were kept at 23° C. for two days and then at 50° C. for three days and peeled off at a pulling rate of 50 mm/min. to measure the tensile shear strength.

T-shape Peeling Strength

On an aluminum plate (according to JIS H 4000. A-1050P. 200 mm×25 mm×0.1 mm), the mixture was coated in a thickness of about 0.5 mm. A pair of the same plates coated with the mixture were laminated with facing the coated surfaces to each other and pressed five times by moving a hand roller with 5 kg of load along the length in one direction. The laminated plates were kept at 23° C. for two days and then at 50° C. for three days and peeled off at a pulling rate of 200 mm/min. to measure the T-shape peeling strength.

Before storage, the tensile shear strength was 62 kg/cm$^2$ and the T-shape peeling strength was 5.3 kg/25 mm, while after storage at 50° C. for one month, the tensile shear strength was 58 kg/cm$^2$ and the T-shape peeling strength was 5.6 kg/25 mm. There was no material difference of the tensile shear strength and the T-shape peeling strength before and after storage.

EXAMPLES 2–5

In the same manner as in Example 1 but using an organic tin compound shown in Table 2 in place of dibutyltin dilaurate in the liquid B, the liquids A and B were prepared and subjected to the storage test, and the tack free time was measured.

The results are shown in Table 2.

TABLE 2

| Example No. | Tin compound in liquid B | Tack free time (Hrs) Before storage | After storage |
|---|---|---|---|
| 2 | Dioctyltin didecanoate | 6.5 | 5.2 |
| 3 | Dibutyltin dihexadecanoate | 9.2 | 8.7 |
| 4 | Bis(dibutyltin-laurate) oxide | 2.6 | 3.6 |
| 5 | Bis(dioctyltin-octanoate) oxide | 3.2 | 4.5 |

EXAMPLES 6–8

In the same manner as in Example 1 but using the polymer prepare in Preparation Example 2, 3 or 4 in place of the polymer prepared in Preparation Example 1 in the liquid A, the liquids A and B were prepared and subjected to the storage test, and the tack free time was measured.

The results are shown in Table 3.

TABLE 3

| Example No. | Polymer in liquid A (parts) | Organic tin compound in liquid B | Tack free time (Hrs) Before storage | After storage |
|---|---|---|---|---|
| 6 | Prep. Ex. 2 (100) | Dibutyltin dilaurate | 6.8 | 4.7 |
| 7 | Prep. Ex. 3 (100) | Bis(dibutyltin laurate) oxide | 4.2 | 4.0 |
| 8 | Prep. Ex. 4 (40) Prep. Ex. 1 (60) | Bis(dibutyltin laurate) oxide | 2.8 | 3.4 |

What is claimed is:

1. A two-pack type curable composition comprising:

A. a first liquid containing (1) an organic elastomeric polymer having, in a molecule, at least one silicon-containing group to the silicon atom of which a hydroxyl group and/or a hydrolyzable group are bonded and which is cross linkable through formation of a siloxane linkage and (2) a curing agent for an epoxy resin, and B. a second liquid containing an epoxy resin, at least one organic tin compound selected from the group consisting of compounds of the formulae:

$$R^1_2Sn(OCOR^2)_2 \quad (I)$$

and

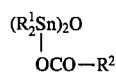

wherein $R^1$ is a monovalent hydrocarbon group, and $R^2$ is a monovalent aliphatic hydrocarbon group having 7 to 19 carbon atoms, and at least one inorganic filler which is calcium carbonate.

2. The two-pack type curable composition according to claim 1, wherein the organic elastomeric polymer has a backbone comprising the repeating units of the formula —R—O— in which R is a $C_2$-$C_4$ alkylene group.

3. The two-pack type curable composition according to claim 2, wherein the backbone comprises polypropylene oxide.

4. The two-pack type curable composition according to claim 1, wherein the silicon-containing group and/or a hydrolyzable group are bonded and which is cross linkable through formation of a siloxane linkage represented by the formula:

wherein X is a hydroxyl group or a hydrolyzable group, $R^3$ is a monovalent hydrocarbon group having 1 to 20 carbon atoms or a triorganoeiloxy group of the formula: $R^{43}$—Si—O— in which $R^4$ is a monovalent hydrocarbon group having 1 to 20 carbon atoms, "a" is 0, 1, 2 or 3, "b" is 0, 1 or 2 provided that the total of "a" and "b" is at least 1, and "m" is 0 or an integer of 1 to 18.

5. The two-pack type curable composition according to claim 4, wherein the total of "a" and "b" is from 1 to 4.

6. The two-pack type curable composition according to claim 1, wherein the organic elastomeric polymer has a molecular weight of from 500 to 50,000.

7. The two-pack type curable composition according to claim 1, wherein a weight ratio of the epoxy resin to the organic elastomeric polymer is from 100:1 to 1:100.

8. The two-pack type curable composition according to claim 1, wherein an amount of the curing agent for the epoxy resin is from 0.1 to 300 parts by weight per 100 parts of the epoxy resin.

9. The two-pack type curable composition according to claim 1, wherein the organic tin compound is at least one selected from the group consisting of $(C_2H_5)_2Sn(OCOC_7H_{15})_2$, $[(C_2H_5)_2SnOCOC_7H_{15}]_2O$, $(C_4H_9)_2Sn(OCOC_7H_{15})_2$, $[(C_4H_9)_2SnOCOC_7H_{15}]_2O$, $(C_4H_9)_2Sn(OCOC_{11}H_{23})_2$, $[(C_4H_9)_2SnOCOC_{11}H_{23}]_2O$, $(C_4H_9)_2Sn(OCOC_{19}H_{39})_2$, and $[(C_4H_9)_2SnOCOC_{19}H_{39}]_2O$.

10. The two-pack type curable composition according to claim 1, wherein an amount of the organic tin compound is from 0.1 to 20 parts by weight per 100 parts of the organic elastomeric polymer.

11. The two-pack type curable composition as claimed in claim 1, wherein the organic tin compound is bis(dibutyl tin laurate)oxide.

* * * * *